A. MORLEY.
Stock Yard.
No. 56,249.
Patented July 10, 1866.
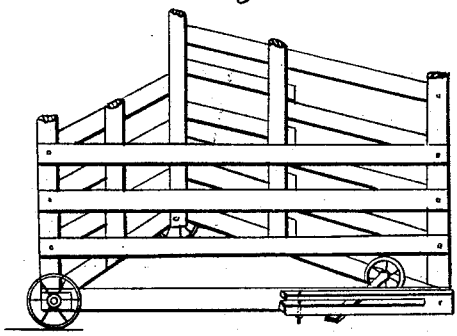
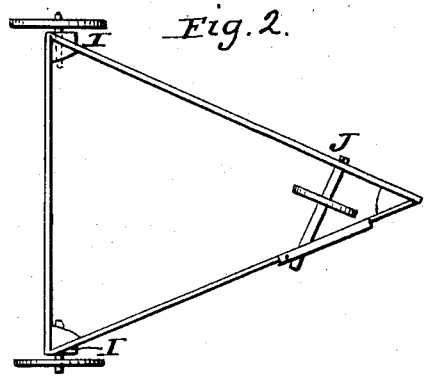
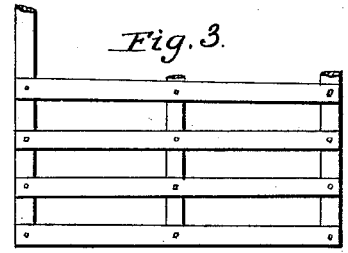
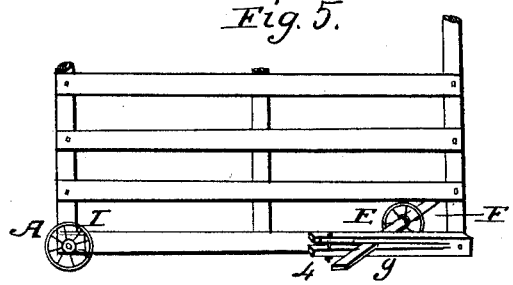
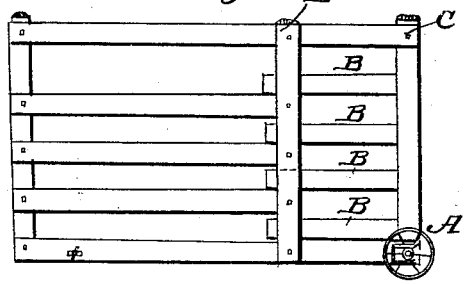
Witnesses:
Inventor:
Avan Morley

UNITED STATES PATENT OFFICE.

ALVAN MORLEY, OF DELAWARE TOWNSHIP, DELAWARE COUNTY, IOWA.

IMPROVEMENT IN STOCK-YARDS.

Specification forming part of Letters Patent No. 56,249, dated July 10, 1866.

*To all whom it may concern:*

Be it known that I, ALVAN MORLEY, of Delaware township, in the county of Delaware and the State of Iowa, have invented a new and Improved Mode of Pasturing Stock; and I do hereby declare that the following is a full and exact description thereof, reference being had to the accompanying drawings, and to the letters of reference marked thereon.

The nature of my invention consists in causing animals to move their own inclosure or confinement in a circle of any diameter I please.

To enable others to make and use my invention, I will proceed to describe its construction and operation.

I construct a yard of boards and posts of the usual height, making one side one board higher than the other, to admit stock under it through the bars, the upper and lower boards to be the whole length of the side. To strengthen it where the bars are I make it three-sided, two of the sides twenty and one sixteen feet long. I bolt it together with bolts and screws, so that it may rock when moving over an uneven surface and not injure it. I place a wheel under each corner for it to move on, one of them hung in such a way that it acts like a rudder, and is fixed so that by a screw-bolt through a pair of clamps the end of the axle of the rudder-wheel is kept firm in any position I wish, which will cause the yard to describe any desired circle when pushed or drawn forward or backward, which may be done by one or more of the animals being hitched to the hind part of the yard and his head tied to the forward part of the yard to make him feed the right way, and he will draw the yard as he feeds along.

It might be best when more than one animal is required to move the yard to let them put their heads through the forward end of the yard and feed on the outside, and so push the yard along with their shoulders and breasts. Any number of yards can be hitched on behind the first yard, which might be drawn by a yoke of oxen hitched inside of it. They may be hitched to both sides of the forward yard by a wire fence, twenty feet or more long, or more, between each of the hind yards, and set the wheels so as to cause the two strings of yards to spread themselves apart considerable, then connect the two hindmost yards together with a wire fence, making a yard of considerable size, in which stock can be pastured.

What I claim as my invention, and wish to secure by Letters Patent, is—

The construction of a stock-yard or grazing-pen, constructed substantially as and for the purposes described, and named "a self-moving stock-yard."

ALVAN MORLEY.

In presence of—
GEORGE SHELDEN,
MARY ROGERS.